United States Patent [19]

Kimizuka

[11] 3,952,237
[45] Apr. 20, 1976

[54] ROTARY BODY CONTROL APPARATUS
[75] Inventor: Junichi Kimizuka, Tokyo, Japan
[73] Assignee: Canon Kabushiki Kaisha, Tokyo, Japan
[22] Filed: June 20, 1974
[21] Appl. No.: 481,547

[30] Foreign Application Priority Data
  June 26, 1973 Japan............................ 48-72062
  July 10, 1973 Japan............................ 48-77620

[52] U.S. Cl............................ 318/310; 318/314; 318/313
[51] Int. Cl.² ........................................ H02P 5/16
[58] Field of Search.................... 318/313, 314, 310

[56] References Cited
UNITED STATES PATENTS
3,241,023 3/1966 Eby...................... 318/314
3,691,440 9/1972 Haddock................ 318/313
3,821,604 6/1974 Walraven............... 318/313
3,828,234 8/1974 Goldberg................ 318/314

Primary Examiner—Benjamin Dobeck
Attorney, Agent, or Firm—Fitzpatrick, Cella, Harper & Scinto

[57] ABSTRACT

A rotary body control apparatus for controlling both speed and phase of the rotary body such as d.c. motor in a single circuit. Speed control is accomplished on the basis of a reference signal without provision of independent control system and, a phase comparison unit serving as means for detecting speed is provided to control phase. A number of stabilized regions is provided so as to effect locking-in with the reference signal in a suitable stabilized region with a reduction in time. The apparatus consists of speed signal generating means, reference signal introducing means, output signal forming means, output signal sampling means, and oscillating means.

17 Claims, 42 Drawing Figures

ROTARY BODY CONTROL APPARATUS

BACKGROUND OF THE INVENTION

1. Field of the Invention

This invention relates to rotary body control apparatuses for controlling the speed and phase of the rotary body and, more particularly, to a rotary body control apparatus of the type which is quick in starting and which can easily phase lock-in with a reference phase signal.

2. Description of the Prior Art

Suppose that a voltage $E_o$ so as to flow a maximum allowable current is applied to a rotary body such as d.c. motors, to which a load having a sufficiently great inertia efficiency, for example, a load such as a magnetic disc, is fixed, the starting characteristic is shaped in the curve close to the primary delay element as shown in FIG. 1($a$) and is finally shaped to be a constant speed $S_o$ in a fairly long time. However, normally a control apparatus is added to the rotary body so that operation is performed at a speed $S_1$ lower than $S_o$ in a synchronous relation with a reference phase.

In control of the phase as described, if the accuracy of the phase synchronization is demanded, it is required to increase gain in a phase control system so that great torque is developed with respect to a fine deviation of the phase. With this construction, however, the greater phase deviation displaces a linear region in the phase contorl system, resulting in the lock-in of the phase synchronization being not assured.

The difficulty of the phase-lock in a phase control system having a high gain is additionally caused by the fact that when a phase of a phase signal from the rotary body is considerably displaced from a reference phase even if the speed of the rotary body is a predetermined speed, a great erroneous signal is detected so that voltage applied to the rotary body is fluctuated, resulting in the speed maintained at a predetermined rate as described hereinbefore being put into disorder, thus not assuring the phase lock. Further, if the phase synchronization is normally effective after the rotary body has been started, the lock-in would probably fail and the rising would also be inadequate. For this reason, it has been designed so that normally only speed contrl is performed until the speed of the rotary body reaches a required value after it is started, thereafter the phase control is also performed. According to the conventional procedure, however, the speed has been determined independently of frequencies of the reference phase signal, which lacks in stability. Moreover, if both speed control and phase control are carried out at speeds in the range required as described above, the rising characteristic would has been grown worse as shown in the dotted line in FIG. 1($c$).

SUMMARY OF THE INVENTION

It is therefore an object of this invention to provide a rotary body control apparatus which will perform speed control and phase control of the rotary body.

It is a further object of this invention to provide a rotary body control apparatus in which time reaching a predetermined speed is short.

Another object is to provide a rotary body control apparatus which will extremely easily lock-in with a reference phase signal.

Another object is to provide a rotary body control apparatus which may lock-in with the reference phase signal in a plurality of positions of the rotary body.

A further object is to provide a rotary body control apparatus which can be driven at substantially a predetermined speed even if the reference phase signal is not received from the outside.

Another object is to provide a rotary body control apparatus in which a single circuit is provided to effect speed control and phase control.

Other objects and features of the invention will become more apparent as the explanation of the particular physical embodiment in conjunction with the illustrate drawings progresses.

DESCRIPTION OF THE PREFERRED EMBODIMENTS

Figure 1:
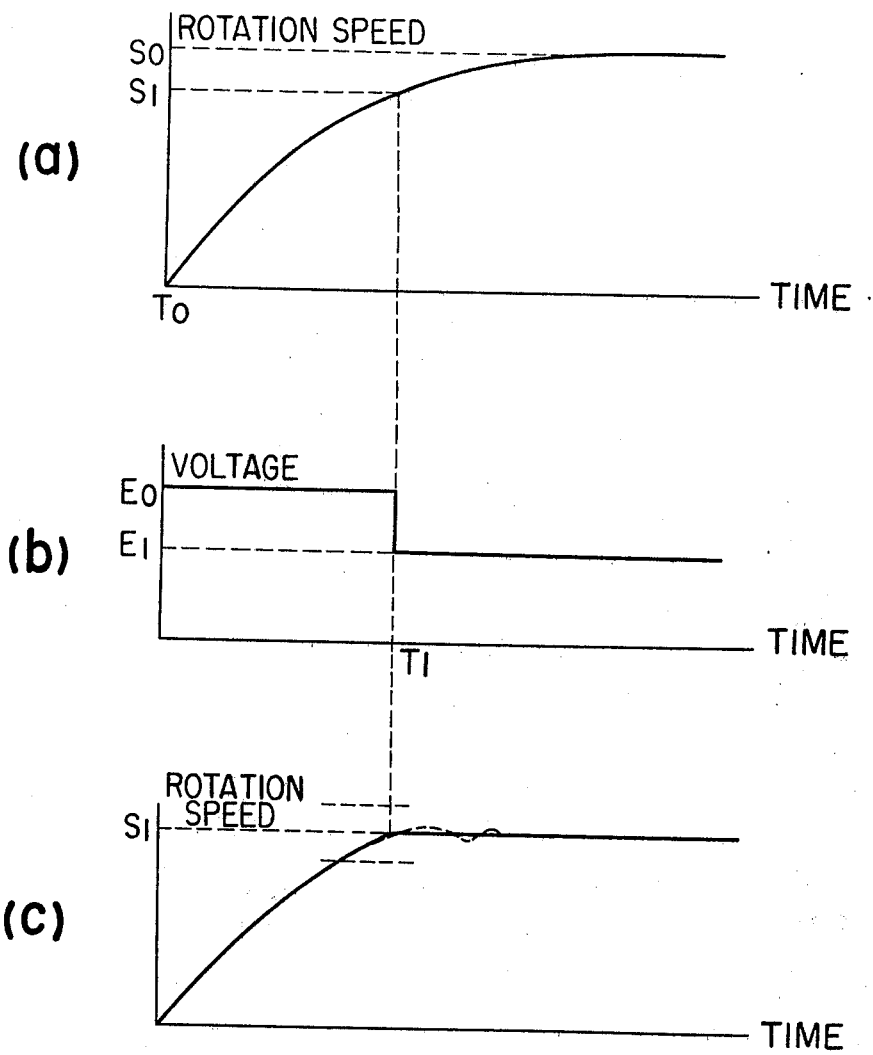
FIG. 1 shows curves of starting characteristics of a rotary body, FIG. 1($a$) illustrating a starting characteristic when a predetermined voltage is applied, FIG. 1($b$) illustrating a voltage waveform controlled by a control system, and FIG. 1($c$) illustrating a starting characteristic when a control system is provided.
Figure 2:
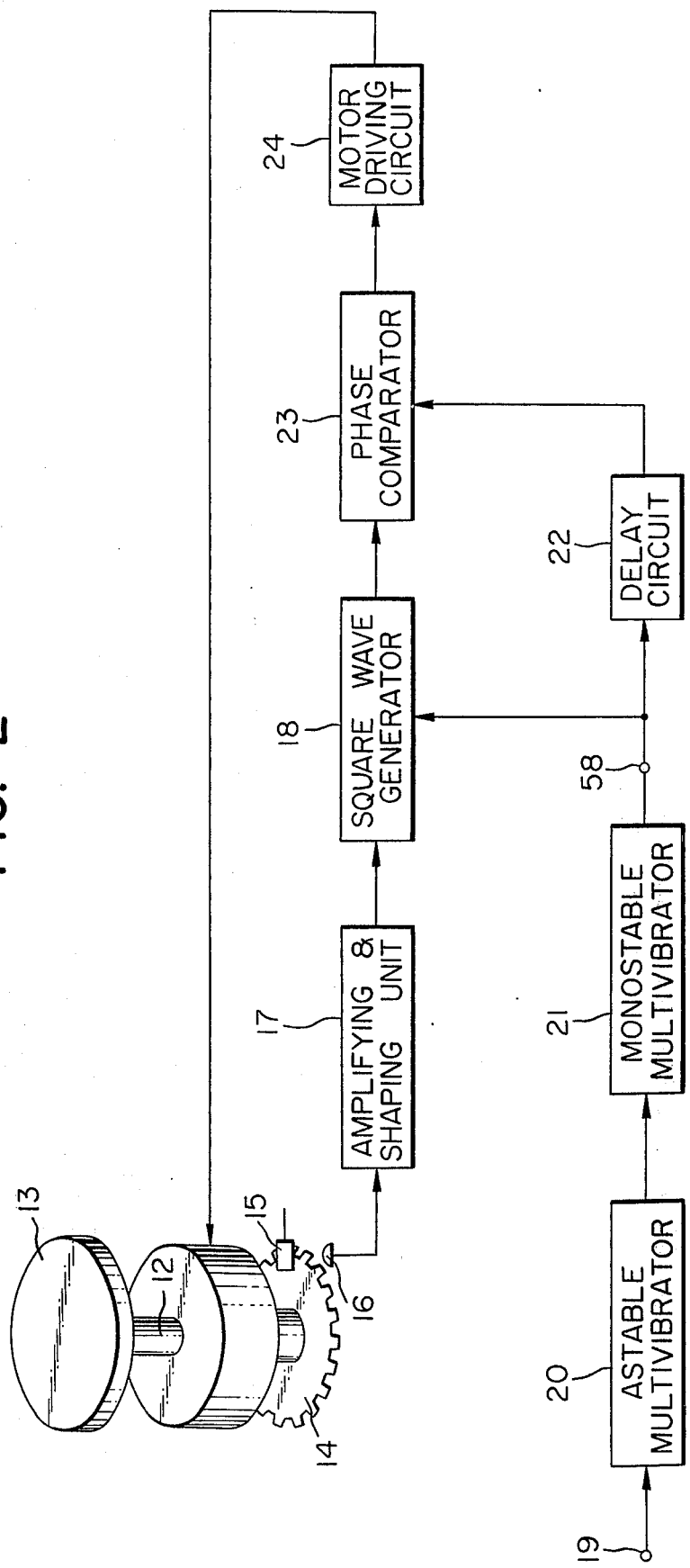
FIG. 2 is a block diagram showing a rotary body control apparatus in accordance with the present invention.
Figure 3:
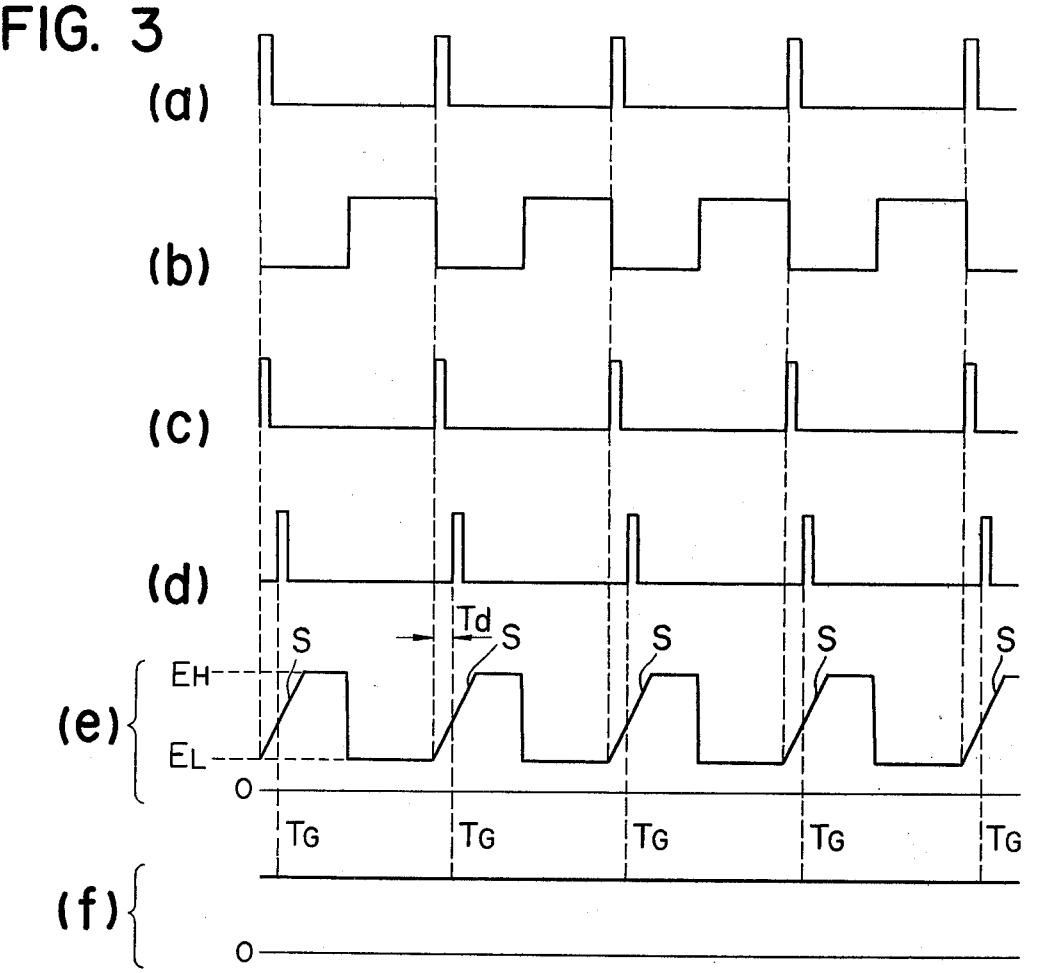
FIG. 3 shows waveforms obtained by various portions of the rotary body control apparatus shown in FIG. 2, FIG. 3($a$) illustrating a reference phase signal, FIG. 3($b$) illustrating a square wave obtained at a square wave generator 18, FIG. 3($c$) illustrating a signal obtained at a monostable multivibrator 21, FIG. 3($d$) illustrating a signal obtained at a delay circuit 22, and FIGS. 3($e$) and ($f$) illustrating signals obtained at a phase comparator.
Figure 4:
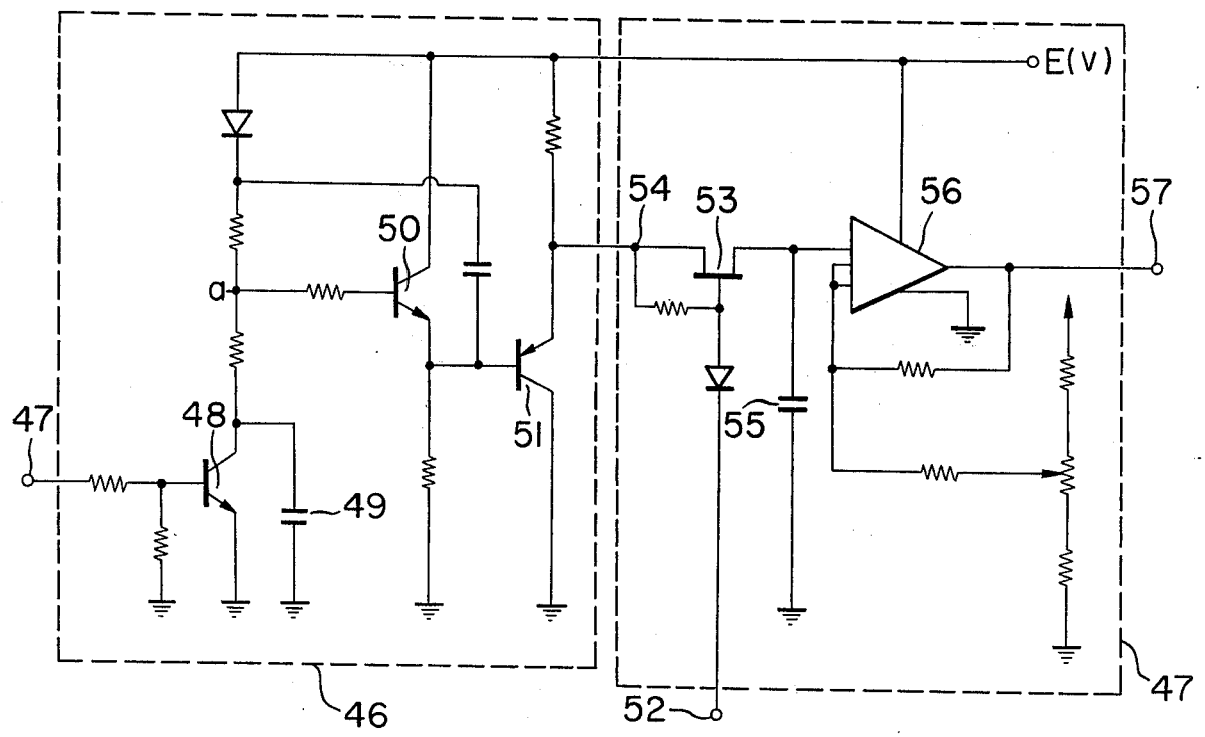
FIG. 4 is a further detailed circuit diagram illustrating the square wave generator at 18 in FIG. 2.

The present invention will now be described with reference to a specific embodiment shown in the accompanying drawings. FIG. 2 is a block diagram schematically illustrating a rotary body control apparatus according to the present invention, which comprises a d.c. motor for driving a rotary body, speed of which is changed in response to a voltage applied in such a manner that when the voltage applied is high, rates of rotation increase while the voltage applied is low, rates of rotation decrease. To one end of a rotating shaft 12 is fixed a rotary body load 13 such as a magnetic disc, while to the other end thereof is fixed a toothed disc 14 for generating a speed signal. This toothed disc 14 has its circumference equally divided to form 100 teeth (signal generator). A luminescent diode 15 and a photo-transistor 16 are each secured in positions separate from that of the toothed disc 14 so as to hold said teeth therebetween. With this arrangement, when the aforementioned motor is driven, the toothed disc also rotates so that the light directed from the luminescent diode to the photo-transistor is interrupted thereby a pluse signal (hereinafter referred to as the speed signal), from the photo-transistor, of the frequencies in proportion to the rotation of the motor is obtained. In other words, the toothed disc 14, the luminescent diode 15, and the photo-transistor 16 define a speed signal generator. Since the speed signal thus obtained by the photo-transistor has its output being low in level in general, the speed signal is amplified by a speed signal amplifying and shaping unit 17 and is shaped into a square wave. This signal amplifying and shaping unit 17 comprises a conventional amplifier and a Schmitd trigger circuit extensively used and known in which an output of the amplifier is applied and when an input is in excess of limited level, the output is rapidly changed by the positive feedback. The speed signal thus shaped is counted down by the square wave generator 18 composed of a counter, flip-flops, and so on later described to the amount corresponding to the number of teeth of the toothed disc 14 to convert into a square wave with one rotation of the motor established as one period. It is however noted that the square wave generator 18 has another function to detect the speed and is so designed as not to produce the square wave unless speed signals (that is, one hundred speed signals) for one rotation of the motor are entered within one period of the reference signal later described. From a terminal (19) a reference signal (an exterior reference signal) as shown in FIG. 3(a), for example, a vertical synchronous signal or the like as in a television signal is applied to a known astable multivibrator 20. This astable multivibrator 20 is so set as to oscillate at a frequency $f_1$ substantially equal to a frequency $f_2$ of the reference signal applied to the terminal 19 and, when the reference signal is not applied, the astable multivibrator controls the aforementioned motor to be rotated by its own oscillation frequency $f_1$ so that it may be driven at a speed substantially equal to the normal speed. However, if the reference signal is applied from the terminal 19 in such a condition as described, the astable multivibrator 20 being oscillated at its own oscillation frequency $f_1$ is locked into the frequency $f_2$ of the reference signal so that the motor 11 may be controlled by the frequency $f_2$ after the reference signal has been applied. Accordingly, the output of the astable multivibrator 20 is as shown in FIG. 3(b). The output of the astable multivibrator 20 is applied to a monostable multivibrator 21, which in turn produces a pulse of a predetermined amplitude as shown in FIG. 3(c). In other words, when the exterior reference signal is applied to the terminal 19, the monostable multivibrator 21 obtains the pulse signal at frequency $f_2$, while when the exterior reference signal is not applied thereto, the monostable multivibrator 21 obtains the pulse signal at frequency $f_1$, which is the interior reference signal internally formed. The output of the monostable multivibrator 21 thus obtained is applied to a reference signal introducing terminal 58. The reference signal appled to the terminal 58 is then divided into two parts, one part of which is applied to the square wave generator 18 later described in detail with reference to FIG. 4 to serve as a speed reference signal, while the other part being applied to a delay circuit 22 and then applied to a phase comparator 23 after the lapse of a predetermined time $T_d$ as shown in FIG. 3(d) so as to serve as a phase reference signal. The output of the square wave generator 18 is applied to the phase comparator 23. This phase comparator comprises a conventional bootstrap circuit 46 and sample hold circuit 47 as shown in FIG. 4. When the square wave as shown in FIG. 3(b) is applied to the terminal 47 connected to the square wave generator 18 while a low level portion of the square wave being applied, transistor 48 is turned off and the charge is gradually accumulated by the power source E (V) into a capacitor 49 so that the potential at point $a$ gradually increases and is maintained in constant after the capacitor 49 has been charged and thereafter, when a high level portion of the square wave is applied to the transistor 48, the transistor 48 is turned on to effect the rapid discharge, whereby the potential at point $a$ will drop to a predetermined low potential. As a result, from transistor 50 and transistor 51 for impedance conversion, trapezoidal waves formed with inclined portions S between high level $E_H$ and low level $E_L$ may be obtained.

The output of the bootstrap circuit 46 is further applied to the sample hold circuit 47, in which a gate signal (a sample signal) is applied to a gate terminal 52 MOS transistor 53 which constitutes a gate circuit to turn the MOS transistor 53 on, thus maintaining the charge of the signal applied from the bootstrap circuit 46 to the terminal 54 within the capacitor 55, and the terminal voltage of the capacitor 55 is then led through an amplifier 56 to an output terminal 57. As described hereinbefore, the phase reference signal causes the reference signal to delay by the time $T_d$ as shown in FIG. 3(d). Thus, when this phase reference signal is applied as the gate signal (the sample signal) as described above to the gate terminal 52, the voltage at the inclined portion S of the trapezoidal wave may be sampled at the time $T_G$ shown in FIG. 3 so as to lead the sample voltage into the output terminal 57. Therefore, if the motor is driven at a constant speed, the waveform is substantially constant as shown in FIG. 3(f). Thus, when the voltage as described is applied to a motor driving unit 24 comprised of a conventional amplifier, the motor remains driven at a constant speed. However, the amplifier reverses the phase of signal therefore, when the motor must be accelerated, the low level output is derived from the sample hold circuit while when the motor must be reduced, the high level output is derived therefrom. Even if the phase is displaced in this condition, the relative position between the signal waveform formed with an inclined portion and the sample signal is displaced and varied according to the phase, and the sample potential may be sampled in such a manner that such displacement of the phase is corrected whereby the motor can normally be driven maintaining a proper phase.

Conversely, suppose that the direct current having a level corresponding to a low level of a rectangular waveform instead of the rectangular waveform current is applied to the terminal 47 of the bootstrap circuit 46 (this is the case where the motor 11 is not yet brought into a predetermined speed, that is, the motor 11 must be placed into the accelerating condition), the transistor 48 is maintained in the on condition so that the point a is held at a low level. As a result, even from the transistor 51, a d.c. signal having the same potential as the low level $E_V$ of the signal waveform having an inclined portion shown in FIG. 3(e) is derived. Accordingly, even if the gate signal is applied from the gate terminal 52, the signal of low level voltage may be regularly obtained from the output terminal 57, whereby the signal as described is applied through the phase reversible motor driving unit 24 to the motor 11 to accelerate the motor 11.

From the above, it will be appreciated that the rotary body control apparatus as constructed above provides the outstanding characteristics in terms of better starting characteristic and better phase characteristic by the provision such that a predetermined high level potential of acceleration is continuously applied to the motor until it reaches a predetermined speed after the motor has been actuated, and after reached the predetermined speed, the phase control is carried out.

Figure 5:
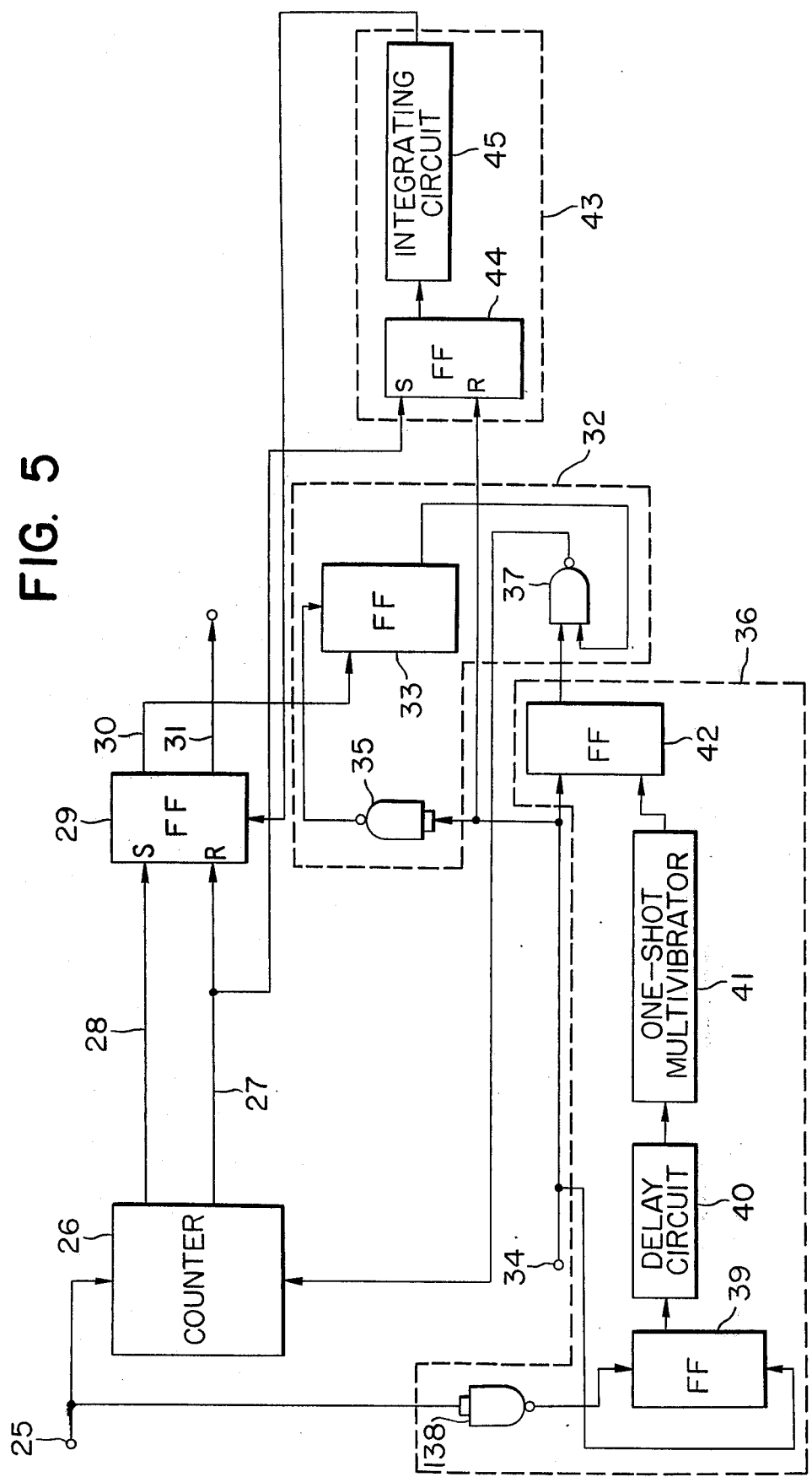
FIG. 5 is a block diagram illustrating the square wave generator 18 in FIG. 2 and other circuits added thereto.
Figure 6:
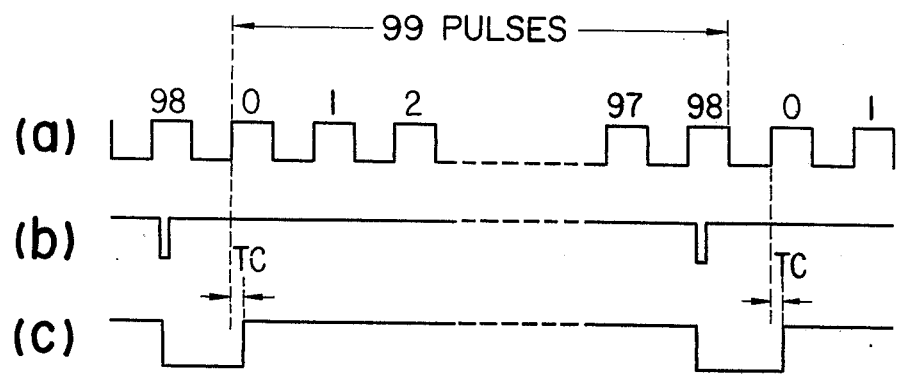
FIG. 6 shows waveforms representing the status when the rotary body is not reached a predetermined speed, FIG. 6($a$) illustrating a speed signal, FIG. 6($b$) illustrating a speed reference signal, and FIG. 6($c$) illustrating a counter clear signal.

The principal part of the present invention will now be further described in detail. FIG. 5 is a block diagram of the square wave generator designated as 18 in FIG. 2 and other circuits added thereto. The counter 26 has its coded number equal to the number of speed signals generated during one rotation of the motor, that is, in this particular embodiment, the counter 26 is in the form of a centesimal counter because the toothed disc 14 has 100 pieces of teeth. The counter 26 may be of the conventional counter extensively applied in a digital circuit or the like, and therefore, further detailed description thereof is omitted. In brief, any counter which may obtain the output after a predetermined number has been counted may be used. The speed signal derived from the speed signal amplifying and shaping unit 17 is introduced through the terminal 25 into the centesimal counter, and this counter is so designed that when the sixtieth pulse is counted and when the hundredth pulse is counted, outputs may be obtained by output lines 27 and 28 as a second deriving means and a first deriving means, respectively. The counter is adapted to count the number of pulses from 0 so that the pulse of count value 59 corresponds to the sixtieth pulse and the pulse of count value 99 corresponds to the hundredth pulse. The output lines 27 and 28 are connected to reset input and set input, respectively, in the flip-flop 29 as a bistable circuit. When the motor reaches a predetermined speed upon application of a clear signal later described into the flip-flop 29, positive and negative phase sequence square waveform outputs may be obtained from the set output 30 and reset output 31, respectively, in the flip-flop 29, and on the other hand, when the motor is not reached a predetermined speed, a given output of low level and a given output of high level may be obtained from the set output 30 and the reset output 31 in the flip-flop 29. For instance, suppose that the motor is not reached a predetermined speed as shown in FIG. 6 and only 99 speed signals have arrived as shown in FIG. 6(a) during one period of the reference signal as shown in FIG. 6(b) (100 speed signals arrive at a predetermined speed during that period), that is, suppose that the speed of motor is 99% of the predetermined speed, the speed reference signal (FIG. 6(b)) arrives when the counter 26 begins to count the ninety-ninth speed signal, and the counter is cleared by the clear signal (FIG. 6(c)), later described in detail, formed by such a speed reference signal as mentioned above, so that the counter will not count the hundredth speed signal but start the counting from zero again. In consequence, the set signal derived when the counter counts the hundredth speed signal is not applied to the flip-flop 29, whereas the reset signal is applied thereto every time when the counter counts the sixtieth speed signal. Whereupon, the set output in the flip-flop 29 is maintained at a low level while the reset output therein is maintained at a high level to impede the generation of trapezoidal waveform within the phase comparator 23, resulting in the output of the bootstrap circuit being remained at a low level. Thus, when the signal after sampled is applied to the motor driving unit 24, a predetermined accelerating potential $E_o$ is applied to the d.c. motor, which is then accelerated.

Figure 7:
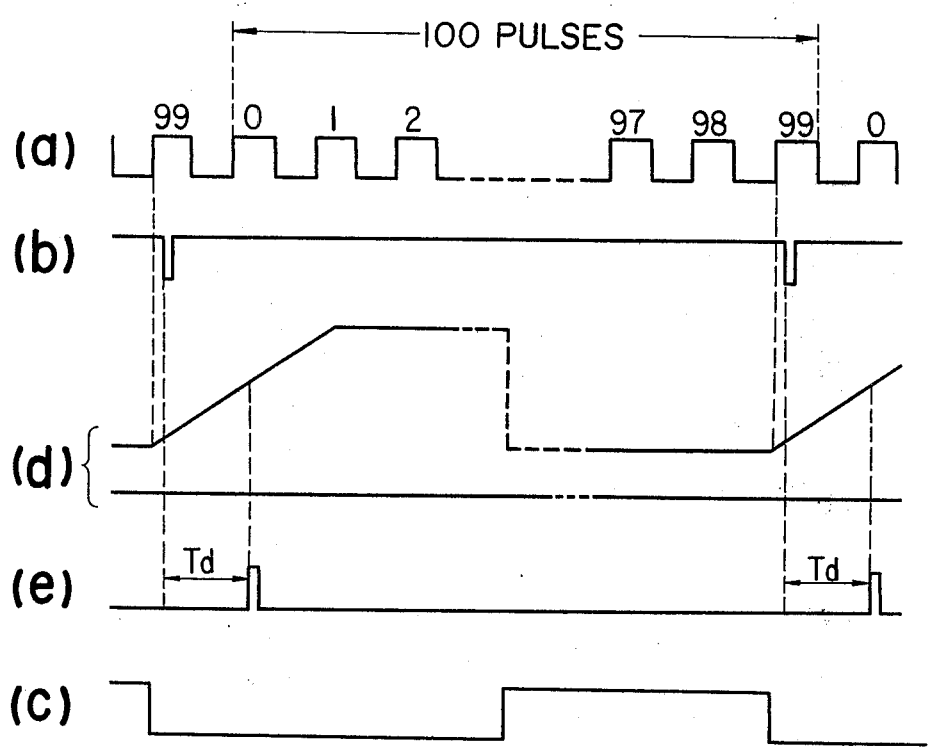
FIG. 7 shows waveforms representing the status when the rotary body reached a predetermined speed, FIG. 7($a$) illustrating a speed signal, FIG. 7($b$) illustrating a speed reference signal, FIG. 7($c$) illustrating a trapezoidal wave, and FIG. 7($d$) illustrating a phase reference signal.

Conversely, suppose that the motor reaches a predetermined speed, as shown in FIG. 7, and the hundredth speed signal (FIG. 7(a)) arrives during one period of the speed reference signal (FIG. 6(b)), the counter 26 counts the sixtieth speed signal so that the flip-flop 29 is reset. Next, when the hundredth speed signal arrives, the set signal is applied from the counter 26 to the flip-flop 29 to reverse the flip-flop so that an output as shown in FIG. 7(c) may be obtained at the reset output terminal in the flip-flop designated as 29 in FIG. 5. The reversed output of the flip-flop initiates the operation of the bootstrap circuit in the phase comparator 23 to form a trapezoidal waveform, as shown in FIG. 7(d), in the bootstrap circuit. The inclined portion formed in the trapezoidal waveform as described is sampled by the phase reference signal (FIG. 7(e)) with time $T_d$ delayed in the delay circuit 22, and the voltage thus sampled is held by the sample hold circuit. The signal thus held is then applied in the form of an output of the phase comparator 23 to the motor driving unit 24.

The degree of inclination formed in the inclined portion of the trapezoidal waveform may be suitably selected by adjustment of time constant between the capacitor 49 and the resistor in the bootstrap circuit 46, and the delay time $T_d$ as described may also suitably be determined. Therefore when the motor is driven at a given rate of rotation, a potential that maintains such rate of rotaion may be applied to the motor driving unit 24, and when the motor is driven at a rate higher than the given rotation, the trapezoidal waveform is formed with a shape relatively displaced to the left with respect to the sampling pulse in accordance with the degree of increased rate of rotation as described above, thereby dropping the voltage obtained in the sample hold circuit 47. On the other hand, when the motor is driven at a rate lower than the given rotation, the trapezoidal waveform is formed with a shape relatively displaced to the right with respect to the sampling pulse in accordance with the degree of reduced rate of rotation as described above, thereby increasing the voltage obtained in the sample hold circuit 47 (because the trapezoidal waveform is produced by the speed signal, and the phase thereof is identical with the phase of rotation of the motor). By suitable selection of the inclination formed in the trapezoidal waveform, the potential to be sampled may be set to a value compensating the displacement of the phase, and the motor may be maintained at a given rate of rotation, controlling the rotation phase into the synchronous relation with the reference phase.

In this case, the allowable range of the phase fluctuation is a range, which includes therein one period of speed signals between the reference phase signals, that is, speed signals generated during one rotation of the motor. This region is referred for convenience to as the stabilized region hereinbelow.

Since this stabilized region corresponds to one priod of teeth formed in he toothed disc 14, one hundred stabilized regions exist on the assumption that the toothed disc has 100 pieces of teeth. That is, if numbers from 0 to 99 are given to 100 teeth of the aforementioned toothed disc, the numbers 0 to 99 form one stabilized region, the numbers 1 to 99 and 0 form another stabilized region, and the numbers 2 to 99, 0, and 1 form still another stabilized region . . . . and so on, thus obtaining one hundred stabilized regions.

When the counter 26 is once cleared and ready for emergence of 100 speed signals until the counter 26 is cleared again, the square waveforms emerge from the counter 26 for phase comparision. The rising portion of the hundredth pulse forms a rising portion of the inclined portion formed in the phase comparing trapezoidal waveform, said rising portion serving as a reference in comparision of phases.

It is noted that there is no knowing which tooth formed in the toothed disc is caused to produce the hundredth speed signal until the rotary body reaches a given rate of rotation, and therefore the tooth incidentally turned to produce a speed signal counted as the hundredth one by means of the counter, when the rotary body reaches a given rate of rotation, will serve as a reference of the phase. Thus, the phase is locked-in and, one period of the speed signal starting from the aforementioned tooth forms a stabilized region. As described hereinbefore, one hundred stabilized regions are formed corresponding to the number of teeth in circumference of the toothed disc, therefore if a stabilized region most opportune for the reference signal is selected, the phase difference would be within the range of 1% instantaneously when the rotary body reached a given rate of rotation. For this reason, according to the present invention, the lock-in may be performed without decreasing the gain even when the gain in the phase control system is extremely great. Furthermore, a complete phase synchronization may be attained by mere correction of a small difference of phase, thereby cutting the lock-in time.

In this case, even if the phase fluctuation with one or more speed signals is occurred at the time when the rotary body reached a given rate of rotation, the stabilized region is merely shifted to another stabilized region and may immediately be entered a new stabilized region.

Here, if the allowable range of the phase difference is widened, that is, if the number of the stabilized regions is reduced, the phase lock-in time becomes longer and the inaccuracy of the lock-in increases in proportion to the number of the stabilized regions.

Turning again to FIG. 6(c), the counter clear signal is obtained from the flip-flop which is reset by the reference signal and set at the rising portion of the speed signal, and time TC is provided at the output of the flip-flop by reason such that the counter 26 becomes "0" instantaneously with the application of the counter clear signal to the counter 26, and when the "0" pulse is entered thereat, the counter count it as "1" so that the "0" pulse of the speed signal passes, and therefore, the counter must be held in position of "0".

Since this counter is actuated by the rise of pulse, the interval of the time TC may merely be selected so as to allow the rise of pulse to pass.

Figure 8:
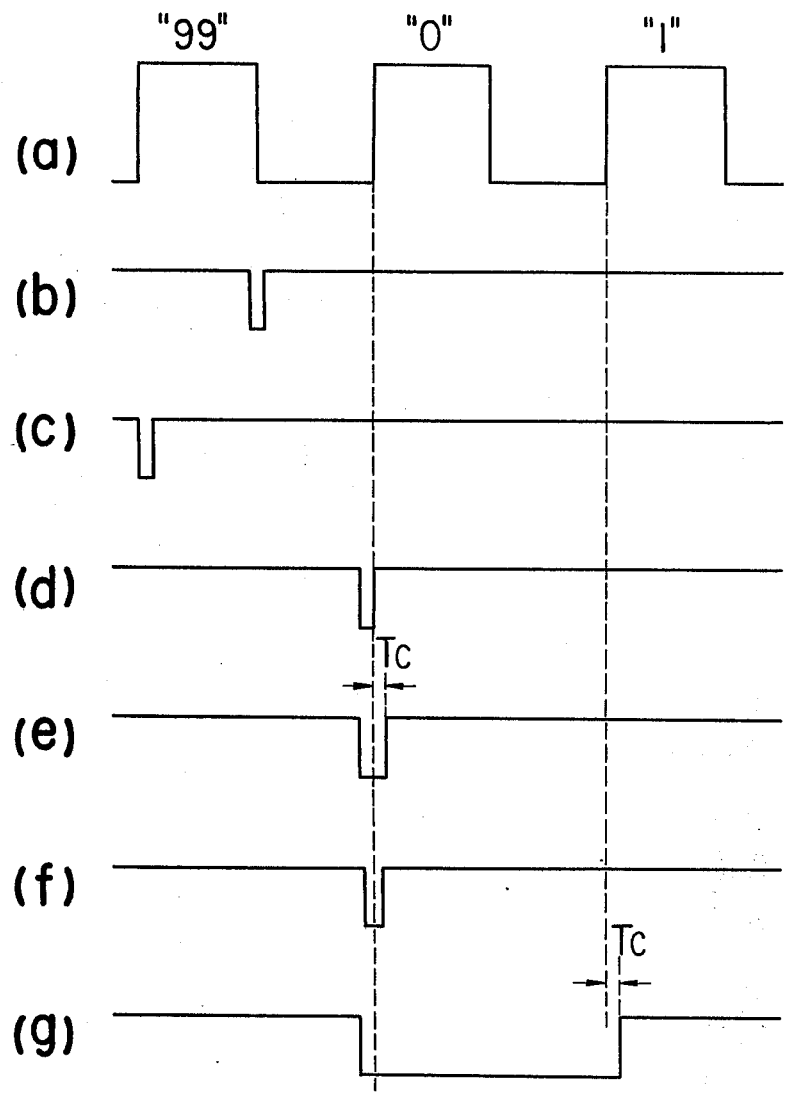
FIG. 8 shows waveforms representing the speed vibration of the rotary body, FIG. 8($a$) illustrating a speed signal, FIGS. 8($b$) – ($d$) and ($f$) illustrating speed reference signals, and FIG. 8($e$) and ($g$) illustrating a counter reset signal.

The most stabilized condition is attained when the speed signal and the speed reference signal are relatively positioned as shown in FIGS. 8(a) and (b), but the preset phase relation is sometimes displaced due to change of time $T_d$ caused by the change of time constant of the delay circuit 22 or due to fluctuation of control voltage caused by the change in temperatures or of the servo system. Suppose now that the phase relation between the speed signal and the reference phase signal is displaced as shown in FIG. 8(c) and the reference phase signal is in the position delayed from the stabilized point, the hundredth pulse of the speed signal is disappeared to accelerate the motor. Then, phase of the speed signal leads and the hundredth pulse is generated. In this case, if the voltage (in the direction of reducing the motor) where the sampling point of a trapezoidal waveform having an inclined portion higher than a reference point receives the sampling, the motor is reduced and the hundredth pulse is again disappeared.

The repetition of such operation as described above causes the motor to occur vibration. Conversely, if the reference phase signal leads from state (d) to state (f) shown in FIG. 8 to partly join with the 0th pulse, the reset signal of the counter 26 is changed from state (e) into state (g) shown in FIG. 8. As a result, the first pulse proper to the speed signal is counted as the 0th pulse, which results in reduction of the count value than is actually obtained. At this time, the motor 11 is controlled so as to be accelerated. However, when the inertia of the motor and load is so great that the motor is less accelerated, the head portion of the hundredth speed signal is sometimes almost joined with the reference phase signal. In this case, if the phase of the reference phase signal is slightly led, the hundredth output of the counter is not derived so that the accelerating voltage is applied to the motor. Thus, the phase of the speed signal leads and the speed increases accordingly to provide the hundredth output.

At this time, the sampling point comes in the acceleration region of the motor, and the phase moves in the direction of reducing motor speed as the phase of the speed signal gradually leads. Finally, the reference phase signal reaches again a position as shown in FIG. 8(d) to effect the repetition of the same action as that hereinbefore described, resulting in the phase period being unstabilized.

As described above, excessive lead or lag of phase of the speed signal causes the motor to place in the unstable rotation. In either case, it happens because the counter is normally cleared. This clearing operation is required until the lock-in is effected after the activation of phase control, but is not required after the lock-in has been made.

In order to eliminate the aforementioned unstable action and to greatly enlarge the stabilized region in the phase control, the procedure should be taken such that a counter clear signal is not applied after the detection of the lock-in and assured that the lock-in has been effected, or a counter clear signal is not applied after reached a given rate of rotation and assured that such given rate of rotation has been detected.

Referring to FIG. 5, there is shown a circuit 32 surrounded in the dotted line, which is a vibration removing circuit for removing rotation-vibration of the motor 11 embodying the latter procedure as mentioned hereinbefore. The circuit 32 comprises a delay flip-flop 33 adapted to apply the aforementioned flip-flop output. A reference signal applied from a terminal 34 is reversed by a NAND gate 35, and said reference signal is formed into a clock signal through the NAND gate 35. The output of the delay flip-flop 33 is applied together with a clear signal (FIG. 9(d)) derived from a clear circuit 36 to a NAND circuit 37, and said NAND circuit output is applied as a clear signal for the counter 26.

Figure 9:
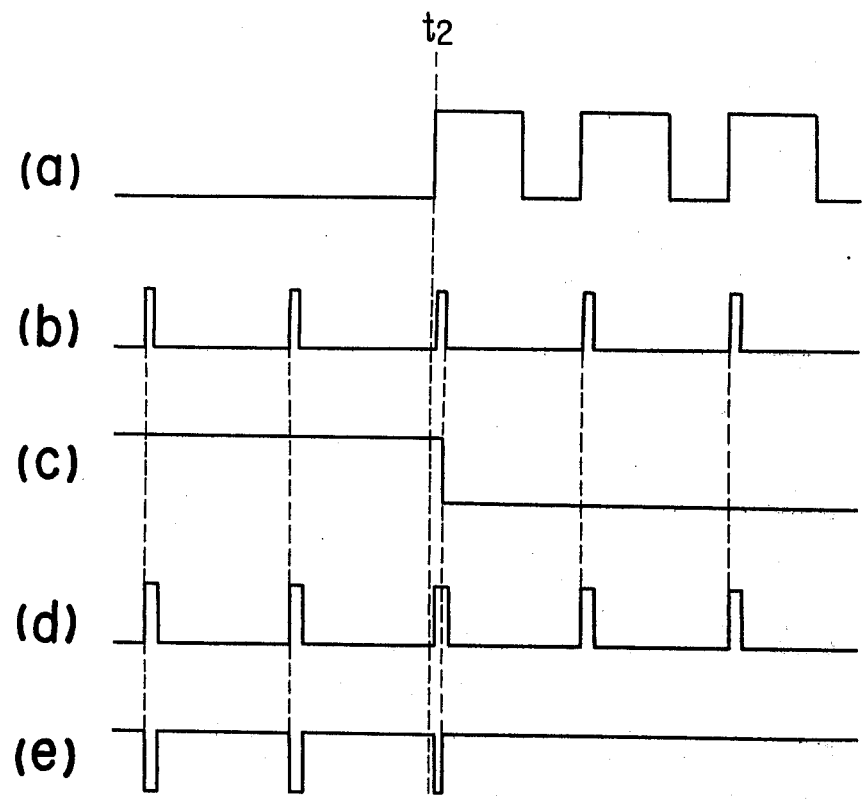
FIG. 9 shows waveforms illustrating a vibration removing circuit, FIG. 9($a$) an output waveform of a flip-flop 29, FIG. 9($b$) a speed reference signal, FIG. ($c$) an output waveform of a flip-flop 33, and FIGS. 9($d$) and ($e$) clear signals.

That is, the flip-flop 29 has a predetermined low level output as shown in FIG. 9(a) (before $t_2$) before the motor begins to rotate but not reached a given rate of rotation, but it produces a square waveform as shown in FIG. 9(a) (after $t_2$) when the motor reached a given rate of rotation at time $t_2$.

Consequently, when the signal as shown in FIG. 9(b) is applied as a clock signal from the NAND circuit 37 to the delay flip-flop, the output as shown in FIG. 9(c) may be obtained from said flip-flop.

Therefore, when the aforementioned clear signal (FIG. 9(d)) and flip-flop output (FIG. 9(c)) are applied to the NAND circuit 37, a reset signal as shown in FIG. 9(e) may be obtained.

As is apparent from the drawing, this reset signal is generated until the motor reaches a given rate of rotation while it is not generated after the motor has reached a given rate of rotation. For this reason, it may be designed so that if such signal as described is applied in the form of a reset signal for the counter 26, the reset signal is not applied to the counter 26 after the motor has reached a given rate of rotation.

Thus, the vibration as previously mentioned may be removed by forming the reset signal in a manner as described.

Further, when the motor reaches a given rate of rotation, the width of the reset pulse is narrowed only at time $t_2$ therefore the number counted by the counter 26 is subtracted by one speed signal.

This influence may be avoided by giving such a treatment that application of one speed signal at the time of a given rate of rotation to the output of the delay flip-flop is delayed. However, it has experimentally been proved that a miss of one speed signal in a transient state is scarcely affected in practical use, so that the aforementioned treatment is not necessarily required.

The stabilized region toward the excessive lead of phase of the speed signal may be greatly widened (up to approximately 50% of one rotation of motor) by addition of the vibration removing circuit as described hereinbefore. Although the stabilized region toward the lag of phase is not so widened, this drawback may be eliminated by setting a phase setting point to the direction of lead of phase. When the reference phase signal is entered into the low level of the square waveform in the flip-flop 29, which is an acceleration region, the clearing function of the counter is restored to thereby minimize such an inconsistency that the accelerating voltage is applied to the motor in a state of excessive speed.

As previously described, when the counter 26 is cleared at the rise of the reference phase signal and the counter 26 is actuated immediately thereafter, the 0th pulse is miscounted as the first pulse. For this reason, the clear circuit 36 hereinbefore described is provided for giving a priority to the reference phase signal in the state just described in order to produce a clear signal so that the clearing condition may be maintained until the pulse immediately after the counter is cleared, and in order to prevent the reset signal for the counter 26 from being failed to be obtained due to the improper operation of the flip-flop 42 when the reference signal rise is duplicated with the speed signal.

Figure 10:
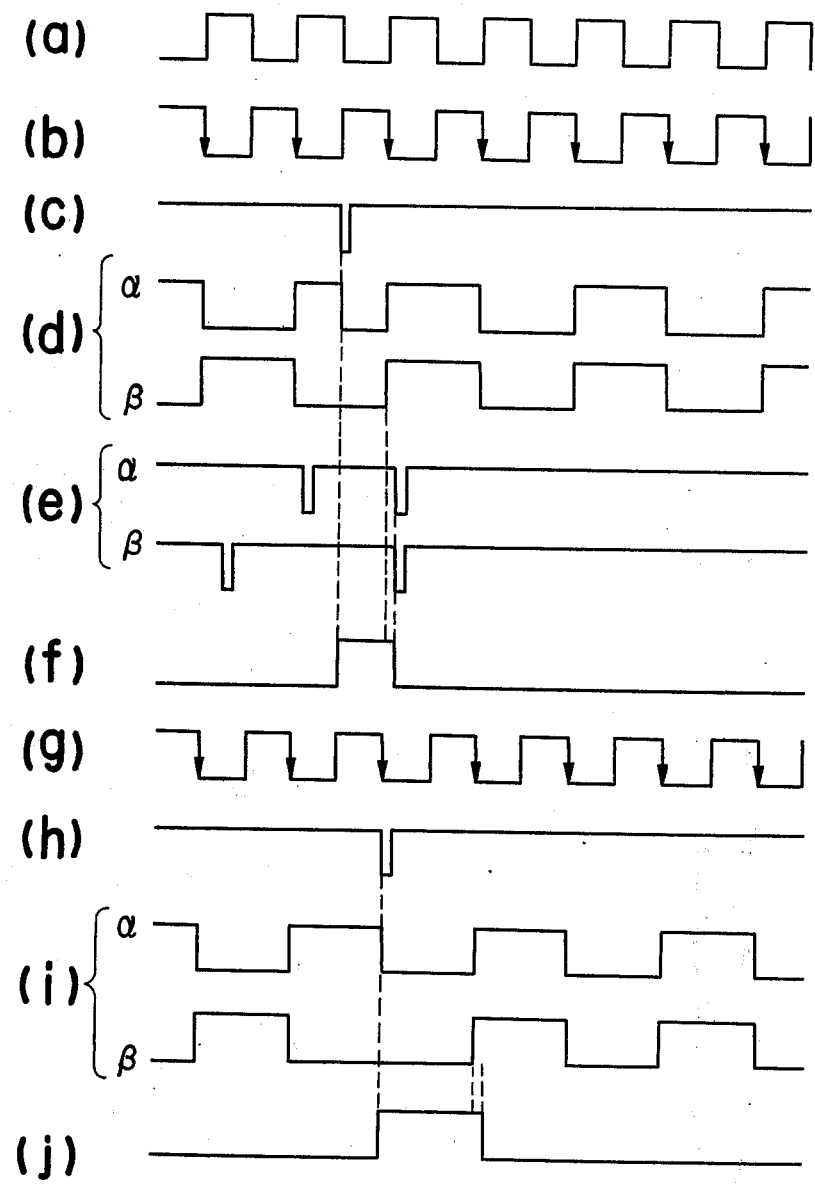
FIG. 10 shows waveforms of assistance in explaining operation of the clear circuit, FIGS. 10($a$), ($b$) and ($g$) are speed signals, FIGS. 10($c$) and ($h$) are reference phase signals, FIGS. 10($d$) and ($i$) are outputs of a flip-flop 39, FIG. 10($e$) are outputs of a one-shot multivibrator, and FIGS. 10($f$) and ($j$) are outputs of a flip-flop 42.

As shown in FIG. 5, the clear circuit 36 comprises a NAND gate 38, a flip-flop 39, a delay circuit 40 having delay time $T_c$, a one-shot multivibrator 41, and a flip-flop 42. A speed signal shown in FIG. 10(a) applied from a terminal 25 is reversed by means of said NAND gate 38 and formed into a signal shown in FIG. 10(b). The speed signal is reversed as described because the counter 26 actuates at the rise of the pulse while the flip-flop 39 actuates at the fall of the pulse. The speed signal thus reversed is divided by a binary flip-flop 39. When a reference signal shown in FIG. 10(c) is applied from a terminal 34 to the flip-flop 39, the flip-flop 39 is forcibly cleared to drop the output to a low level and is set by the speed signal successively entered to a high level. This condition is illustrated in FIG. 10(d), wherein the reference character $\alpha$ denotes the output of the flip-flop 39 at a high level when the reference signal is applied, whereas $\beta$ denotes the output of the flip-flop 39 at a low level when the reference signal is applied. In either case $\alpha$ or $\beta$, the output of the flip-flop 39 is changed from a low level into a high level at the fall of the speed signal followed by the reference phase signal. This output of the flip-flop 39 is applied to the one-shot multivibrator 41 after it has been delayed by time $T_c$ in the delay circuit 40. This multivibrator 41 produces a pulse when the output of the flip-flop 39 is shifted from a low level to a high level so that the pulse thus obtained is as shown in FIG. 10(e). The character $\alpha$ in FIG. 10(e) corresponds to the character $\alpha$ in FIG. 10(d), and the character $\beta$ in FIG. 10(d) corresponing to the character $\beta$ in FIG. 10(e).

The flip-flop 42 is set by the reference signal and reset by the output of the one-shot multivibrator 41, therefore as the output of the flip-flop 42 a signal as shown in FIG. 10(f) is obtained.

As shown in FIGS. 10(g) and (h), when the set input for the flip-flop 42, that is, the speed signal, and the reset input, that is, the reference phase signal are instantaneously applied, the function of the flip-flop 42 becomes indefinite condition. On the other hand, even if the speed signal and the reference phase signal are not joined together but applied close to each other, the flip-flop 42 produces an extremely narrow pulse, resulting in probable malfunction of the counter 26. The binary flip-flop is provided to prevent such malfunction. That is, when the binary flip-flop 39 is cleared by the reference signal, and the speed signal (FIG. 10(g)) enters within the width of pulse of the reference signal (FIG. 10(h)) the output of the flip-flop 39 is inevitably risen, as shown in FIG. 9(i), at the fall of the speed signal successively entered, thereby produce the output of the one-shot multivibrator 41. Therefore, if the pulse width of the reference signal is wider than the sum of the delay time $T_r$ and the pulse width of the output of the one-shot multivibrator 41, the priority is inevitably given to the reference signal so as to avoid the aforementioned indefinite operation of the flip-flop 42 and avoid the pulse width becomes narrow.

It will be obvious that another method may of course be applied with equal utility so that control is secured by the provision of a gate on the output side of the one-shot multivibrator 41.

Since the flip-flop 29 is in an internally indefinite state when the power switch is turned ON, a clear circuit designated at 43 in FIG. 5 is provided to control the initial state of the flip-flop by use of a signal or the reference signal present when the power switch is turned ON. The clear circuit 43 comprises a RS flip-flop 44 and an integrating circuit 45, in which the output line 27 of the counter 26 is applied as a set input and a reference signal is applied as a reset input. In the preferred embodiment of the invention, as previously described, the reset signal is applied from the counter 26 to the flip-flop 29 when the motor reaches a speed more than 60% of a given rate of rotation, and the set signal is applied after the motor has reached a given rate of rotation, so that no control signal is applied from the counter 26 to the flip-flop 29 when the motor is within the range of 60% of a given rate of rotation.

In this condition, the flip-flop 44 is in the reset state and the set output is at a low level. A known CR integrating circuit 45 is connected through an inverter (not shown) to the set output side of the flip-flop, and in such the reset condition, the high level potential from the inverter is applied to the integrating circuit without modification so that a high level signal is derived from the integrating circuit 45 and is then applied as a clear signal to the flip-flop 29. Thus, the flip-flop 29 remains cleared and maintains the motor in the acceleration condition. When the motor speed exceeds 60% of a predetermined value, the sixtieth counting output of the speed signal from the counter 26 is also applied to the set input of the flip-flop 44 therefore a square waveforms is produced therefrom. Since the duty ratio of the square wave changes in response to the rate of rotation of the motor, the output potential of the integrating circuit 45 changes according to the duty ratio of the input square waveform. When the duty ratio is in excess of a certain value, that is, when the motor reaches a value higher than a predetermined rate of rotation, the output of the integrating circuit 45 drops lower than a threshold value for clearing the flip-flop 44, and therefore stops the application of a clear signal to the flip-flop 29.

However, until the motor reaches a given rate of rotation, the set signal for the flip-flop 29 is not applied to maintain the reset state so that the motor remains in its acceleration state. The clear circuit 44 has another function to clear the flip-flop, when the speed of motor abnormally decreases, thereby accelerating the motor.

As is apparent from the foregoing detailed description with respect to the embodiment, the present invention provides speed control of a rotary body, without the provision of an independent speed control system, on the basis of the reference phase signal within the range of rate of rotation suited for operation of the phase control system, and by use of the speed detection and phase comparision unit hereinbefore described. From the above, the resulting apparatus provides circuits, which are simple and inexpensive, and facilitates the synchronous lock-in despite the provision of highly accurate phase control system.

Furthermore, according to the embodiment of the present invention herein described in detail, a number of stabilized regions is provided during one rotation of a rotary body so as to effect phase lock-in a suitable stabilized region when the motor reaches a given rate of rotation. Thus, the lock-in is accomplished with a reduction in time and without difficulty. Once lock-in has been effected, the stabilized region is widened so that the displacement of phase synchronization due to disturbance may be reduced.

By the provision of the apparatus herein described, the synchronous lock-in may readily be accomplished with a reduction in displacement of synchronization in addition to readiness of adjustment, even if a highly accurate and highly gain phase-control system is combined into a rotary body having a great inertia efficiency.

I claim:

1. A rotary body control apparatus comprising a rotary driven body driven at a rate of rotation according to the voltage applied, a pulse signal generating means for generating a pulse signal having frequency according to the speed of said rotary driven body, an introducing means for introducing a reference signal to control the rotation of said rotary driven body, a discriminating means adapted to discriminate if a required number of pulse signals are present during one period of said reference signal, a rectangular waveform generating means for generating a d.c. signal until said discriminating means discriminates that said rotary driven body has reached a predetermined rate of rotation while generating a rectangular waveform after said discriminating means has discriminated that said body had reached said rate of rotation, a sampled signal forming means adapted to apply the output from said rectangular waveform generating means thereby deriving a signal having a certain level to serve as an accelerating signal for said rotary driven body when the d.c. signal is applied and deriving a signal having an inclined portion between one level serving as said accelerating signal and the other level serving as a reducing signal for said rotary driven body when the rectangular waveform is applied, a means for delaying said reference signal, a means for sampling said sampled signal by a sample signal using said delayed reference signal, and a means for applying said already sampled voltage as a driving signal for said rotary driven body.

2. A rotary body control apparatus as defined in claim 1, wherein said pulse generating means comprises a rotating member adapted to be rotated together with said rotary body, a signal generating portions formed on said rotating member in equally spaced relation, and a signal generating means secured in position independently of rotation of said rotary body and disposed facing said signal generating portions.

3. A rotary body control apparatus as defined in claim 2, wherein said signal generating portions comprises a shielding means disposed on said rotating member, and said signal generating means comprises luminous means and light receiving means disposed through said shield means on said rotating member.

4. A rotary body control apparatus as defined in claim 1, further comprising a sample hold circuit including means for holding a voltage of the signal sampled and deriving said voltage held.

5. A rotary body control apparatus as defined in claim 1, wherein said discriminating means comprises output means for introducing signals by counting the number equal to the number of pulses generated during one rotation of said rotary body, another output means for introducing signals by counting the certain number less than the number of pulses generated during said one rotation of the rotary body, and a terminal adapted to apply a reset signal formed by said reference signal.

6. A rotary body control apparatus as defined in claim 5, further comprising a reset signal forming means for forming said reset signal from the reference signal.

7. A rotary body control apparatus as defined in claim 6, wherein said reset signal forming means comprises a means for impeding generation of the reset signal after reached said speed.

8. A rotary body control apparatus as defined in claim 5, wherein rectangular waveform generating means comprises a bistable circuit.

9. A rotary body control apparatus as defined in claim 8, further comprising a clear signal forming circuit for applying a clear signal to said bistable circuit until said rotary driven body reaches a certan speed.

10. A rotary body control apparatus as defined in claim 9, wherein said clear signal forming circuit comprises a second bistable circuit capable of coming into two stable states, a means for applying the signal from said another output means in said discriminating means in the form of a signal for selecting one of the stable states to said second bistable circuit, a means for applying said reference signal in the form of a signal for selecting the other stable state to said second stable circuit, and an integrating means for applying and integrating the output of said second bistable circuit to apply the resulting integrated output in the form of a clear signal to said bistable circuit.

11. A rotary body control apparatus comprising a rotary body driven at a speed according to a voltage applied, a disc rotated according to the rotation of said rotary body and provided with a plurality of signal generating portions equally spaced, a pulse generating means secured in position independently of the rotation of said disc and adapted to detect said signal generating portions to generate the pulse signal, a counter adapted to apply the pulse signal generated by said pulse generating means to the input thereof thereby counting the number equal to the number of pulses generated by said pulse generating means during one rotation of said rotary body, a first output terminal on said counter for introducing the output when the number equal to the number of pulses generated by said pulse generating means is counted, a second output terminal on said counter for introducing the output when the predetermined number less than the number of pulses generated by said pulse generating means during one rotation of said rotary body, a bistable circuit including two input terminals for selecting two stable states, said two input terminals being separately connected to said first and second output terminals, a terminal for introducing an exterior reference signal having frequency $f_1$ to control speed and phase of said rotary body, an astable multivibrator having self-oscillating frequency $f_2$ substantial approximate to said frequency $f_1$, and being connected to said terminal, a monostable vibrator adapted to apply the output of said astable multivibrator, means for applying a reference signal or output obtained by said monostable multivibrator in the form of a clear signal to said counter only in case where the period required for one rotation of said rotary body is longer than one period of the reference signal, an inclined waveform forming circuit, forming waveforms with inclined portions including a capacitor connected in parallel with a short-circuiting transistor, said circuit having its both ends connected to the power source and having its control terminal applied with the output of said bistable circuit, a sample circuit for sampling and holding the output of said inclined waveform forming circuit by means of a sampling signal formed by delaying said reference signal, and means for applying the output of said sample circuit in the form of a driving signal to said rotary body.

12. A rotary body control apparatus comprising:
speed signal generating means for generating a speed signal dependent on the rotary speed of said rotary body;
reference signal developing means for developing a predetermined reference signal, said reference signal developing means including a first oscillator for generating a first signal having a certain frequency and a second oscillator responsive to the first signal from said first oscillator for generating a second pulse signal;
a control signal producing means responsive to the speed signal from said speed signal generating means for producing a given accelerating level of signal which serves to accelerate the rotary speed of said rotary body until the speed of said rotary body reaches a predetermined speed, and producing a given slope of signal between said given accelerating level and a given decelerating level which serves to decelerate the speed of said rotary body, when the speed of said rotary body exceeds the predetermined speed;
sampling means for sampling the output signal from said control signal producing means in accordance with a sampling signal obtained from said reference signal; and
rotary body driving means, to develop a rotary body driving signal in accordance with a sampled output signal from said sampling means, for driving said rotary body.

13. A rotary body control apparatus according to claim 12 wherein said reference signal developing means have an input terminal for receiving an external clock signal which is applied to an input of said first oscillator so that the oscillating frequency of said first oscillator is frequency-locked in with that of said clock signal.

14. A rotary body control apparatus according to claim 12 wherein said first oscillator comprises an astable multivibrator and said second oscillator comprises a monostable multivibrator.

15. A control apparatus comprising:
first signal generating means for generating a first pulse signal;
second signal generating means for generating a second pulse signal to be compared with said first pulse signal;
a counter for counting said fist pulse signal from said first signal generating means during one period of said second pulse signal, said counter developing a first output signal when said counter has counted the predetermined number of first pulse signals, and developing a second output signal when said counter does not count the predetermined number of first pulse signals during the one period of said second pulse signal;

reset signal producing means responsive to said second pulse signal for producing a reset signal to reset said counter;

control signal producing means for producing a given DC level of signal and a given slope of signal between said DC level and another given DC level in accordance with the counting result of said counter;

sampling signal producing means for producing a sampling signal from said second pulse signal;

sampling means for sampling an output signal from said control signal producing means in accordance with said sampling signal; and sample hold means for holding a sampled output signal from said sampling means.

16. A control apparatus according to claim 15 wherein said sampling signal producing means includes delay means for delaying said second pulse signal from said second signal generating means.

17. A rotary body control apparatus comprising:

speed signal generating means for generating a speed signal dependent on the rotary speed of said rotary body;

reference signal developing means for developing a predetermined reference signal;

a counter for counting said speed signal during one period of said reference signal, said counter producing a first output signal when said counter has counted a predetermined number of speed signals and producing a second output signal when said counter does not count the predetermined number of speed signals during the one period of said reference signal;

reset signal producing means responsive to said reference signal for producing a reset signal to reset said counter;

control signal producing means for producing a given DC level of signal and a given slope of signal between said DC level and another given DC level in accordance with the counting result of said counter;

sampling means for sampling the output signal from said control signal producing means in accordance with a sampling signal obtained from said reference signal; and rotary body driving means, to develop a rotary body driving signal in accordance with a sampled output signal from said samplign means, for driving said rotary body.

* * * * *